United States Patent
Olsen (10) Patent No.: US 12,232,453 B2
(45) Date of Patent: Feb. 25, 2025

(54) AGRICULTURAL BALER

(71) Applicant: AGCO Corporation, Duluth, GA (US)

(72) Inventor: Robert James Olsen, Hutchinson, KS (US)

(73) Assignee: AGCO Corporation, Duluth, GA (US)

( * ) Notice: Subject to any disclaimer, the term of this patent is extended or adjusted under 35 U.S.C. 154(b) by 12 days.

(21) Appl. No.: 18/312,188

(22) Filed: May 4, 2023

(65) Prior Publication Data
US 2023/0371435 A1    Nov. 23, 2023

Related U.S. Application Data

(60) Provisional application No. 63/364,945, filed on May 18, 2022.

(51) Int. Cl.
*A01F 15/07* (2006.01)

(52) U.S. Cl.
CPC ...... *A01F 15/071* (2013.01); *A01F 2015/073* (2013.01)

(58) Field of Classification Search
CPC .................. A01F 15/071; A01F 2015/073
See application file for complete search history.

(56) References Cited

U.S. PATENT DOCUMENTS

| | | | | |
|---|---|---|---|---|
| 4,173,112 A | * | 11/1979 | Meiners | A01F 15/071 53/118 |
| 4,641,484 A | * | 2/1987 | Popelka | A01F 15/071 53/399 |
| 4,703,605 A | * | 11/1987 | Ackermann | A01F 15/0715 53/118 |
| 4,917,008 A | * | 4/1990 | van den Wildenberg | A01F 15/0715 53/118 |
| 5,129,207 A | * | 7/1992 | Butler | A01F 15/0715 53/118 |
| 5,129,208 A | * | 7/1992 | Van Zee | A01F 15/0715 53/118 |
| 5,152,125 A | * | 10/1992 | Laver | A01F 15/071 53/210 |
| 5,572,850 A | * | 11/1996 | Lancaster, III | B65B 11/045 53/399 |

(Continued)

FOREIGN PATENT DOCUMENTS

| | | | |
|---|---|---|---|
| EP | 1121850 A1 | 8/2001 | |
| EP | 1602269 A1 * | 12/2005 | ........... A01F 15/071 |

(Continued)

OTHER PUBLICATIONS

UK Intellectual Property Office, Search report for related UK Application No. GB2208772.0, dated Nov. 30, 2022, 4 pages.

(Continued)

*Primary Examiner* — Lucas E. A. Palmer (57) ABSTRACT

A loading apparatus for a round baler for loading a roll of binding material on the round baler is disclosed comprising a binding material support displaceable about a first end between a storage position and a transfer position, in which when in the storage position a first end of the binding material support is raised relative to a second end of the binding material support and when in the transfer position the first end of the binding material support is lowered relative to the second end of the binding material support.

17 Claims, 6 Drawing Sheets

(56) References Cited

U.S. PATENT DOCUMENTS

| | | | | |
|---|---|---|---|---|
| 5,596,864 | A * | 1/1997 | Reeves | A01F 15/071 53/399 |
| 5,996,307 | A * | 12/1999 | Niemerg | A01F 15/0715 53/118 |
| 6,006,504 | A * | 12/1999 | Myers | A01F 15/0715 53/556 |
| 7,181,900 | B2 * | 2/2007 | Hood | A01F 15/0715 100/88 |
| 7,409,814 | B2 * | 8/2008 | Hood | A01F 15/0715 53/399 |
| 10,279,940 | B2 * | 5/2019 | Weber | A01F 15/18 |
| 10,820,527 | B2 * | 11/2020 | Anaparti | A01F 15/0715 |
| 11,071,254 | B2 * | 7/2021 | Noonan | A01D 46/084 |
| 11,617,308 | B2 * | 4/2023 | Weller | A01F 15/0715 53/117 |
| 11,815,907 | B2 * | 11/2023 | Eubanks | A01F 15/071 |
| 2003/0175096 | A1 * | 9/2003 | Korhonen | A01F 15/071 414/24.5 |
| 2008/0264031 | A1 * | 10/2008 | McHale | A01F 15/0715 100/88 |
| 2009/0223179 | A1 * | 9/2009 | Johnstone | A01F 25/14 156/193 |
| 2012/0180430 | A1 * | 7/2012 | Lavoie | A01F 25/14 53/203 |
| 2012/0272837 | A1 * | 11/2012 | Smith | A01F 15/0715 100/34 |
| 2013/0125518 | A1 * | 5/2013 | Smith | A01F 15/0715 53/582 |
| 2021/0400879 | A1 * | 12/2021 | Horst | A01F 15/071 |
| 2022/0356040 | A1 * | 11/2022 | Borchers | A01F 15/0715 |

FOREIGN PATENT DOCUMENTS

| | | |
|---|---|---|
| EP | 3384759 A1 | 10/2018 |
| EP | 3459342 A1 | 3/2019 |
| EP | 3785521 B1 | 3/2023 |

OTHER PUBLICATIONS

European Patent Office, Search Report for related EP Application No. EP23172399, dated Oct. 10, 2023, 9 pages.

\* cited by examiner

AGRICULTURAL BALER

RELATED APPLICATIONS

This application claims the priority benefit of U.S. Provisional Application No. 63/364,945 filed May 18, 2022, said Provisional Application in its entirety being hereby incorporated by reference into the present specification.

FIELD

The present invention relates to a loading apparatus for an agricultural baling apparatus and in particular for an agricultural baling apparatus for producing round bales.

BACKGROUND

Agricultural round balers are well known in the art. Such agricultural balers pick up a harvested crop and feed the crop into a baling chamber where the crop is compressed into a cylindrical bale. Before ejecting the formed bale from the baler it is necessary to wrap or bind the formed bale with a binding material for example a plastics film or a netwrap. The binding material is typically supplied as a wound roll of binding material. It will be appreciated that such rolls of binding material are a major consumable in the operation of such round balers. Additionally, such rolls of binding material are heavy and cumbersome to manoeuvre. Rolls of binding material typically measure between 122 to 130 centimetres (48 to 51 inches) in length and weigh between 30 and 45 kilograms (70 to 100 pounds). However, it is known for some rolls of binding material to be up to 170 centimetres (67 inches) in length with a corresponding additional weight. As such, loading rolls of binding material into position onto the baler by an operator, such that the binding material can then be arranged to be delivered into the baling chamber, is a burdensome task, and one that needs to be repeated throughout the operation of the baler.

A number of solutions to this problem have been proposed. The present invention provides an alternative solution.

BRIEF SUMMARY

According to a first aspect of the present invention, a loading apparatus for a round baler for loading a roll of binding material on the round baler comprises a binding material support displaceable about a first end between a storage position and a transfer position, in which when in the storage position a first end of the binding material support is raised relative to a second end of the binding material support and when in the transfer position the first end of the binding material support is lowered relative to the second end of the binding material support.

Preferably, the binding material support comprises a roll support for a roll of binding material having a first inner lateral edge and second outer lateral edge each extending between first and second ends of the roll support, a stop provided at a second end of the roll support, a first cross member extending beneath the support between the first and second lateral edges and a second cross member extending beneath the support between the first and second lateral edges and located between the first cross member and the first end of the support.

Preferably, the loading apparatus incorporates first and second mounting points, a first longer connecting element pivotally connected at a first end to the first mounting point for rotation about a first pivot axis and pivotally connected at a second end to the first cross member, a second shorter connecting element pivotally connected at a first end to the second mounting point for rotation about a second pivot axis and pivotally connected at a second end to the second cross member.

Preferably, the second mounting point is raised relative to the first mounting point.

Preferably, in the transfer position the second connecting element extends above the first connecting element.

Preferably, in the storage position the second connecting element extends alongside the first connecting element.

Preferably, the first connecting element is connected to an inner side of the first cross member.

Preferably, the second connecting element is connected to an outer side of the second cross member.

Preferably, the first pivot axis is inclined to the vertical.

Preferably, the loading apparatus further comprises an additional stop located across a first end of the roll support when the loading apparatus is in the storage position.

Preferably, the stop provided at the second end of the roll support is V-shaped.

Preferably, an upper edge of the stop provided at the second end of the roll support presents a rounded surface.

Preferably, the second end of the roll support is provided with one or more manipulation means.

Preferably, the loading apparatus further comprises retention means for releasably retaining the roll of binding material on the roll support.

According to second aspect of the invention a round baler comprises a baling chamber, a feed apparatus adapted to introduce the binding material into the baling chamber to enable a formed bale to be bound within the baling chamber, an unwind station in which a roll of binding material may be located for feeding of the binding material to the feed apparatus and a first loading apparatus in accordance with the first aspect of the present invention located to a first side of the baler.

Preferably, the round baler further comprises a second loading apparatus in accordance with the first aspect of the present invention located to a second side of the baler.

Preferably, a latching mechanism is provided to secure the or each loading apparatus to the baler in the storage position.

Within the scope of this application, it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

The invention will now be described, by way of example only, with reference to the accompanying drawings, in which.

DETAILED DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Unless made clear by the context, references to a front end or forward direction are understood to be references to the front of the agricultural baler when being towed by a suitable agricultural vehicle and references to inner and outer, inside and outside are made by reference to a central longitudinal axis of the agricultural baler.

Like reference numerals are used to refer to like parts throughout.

Figure 1:
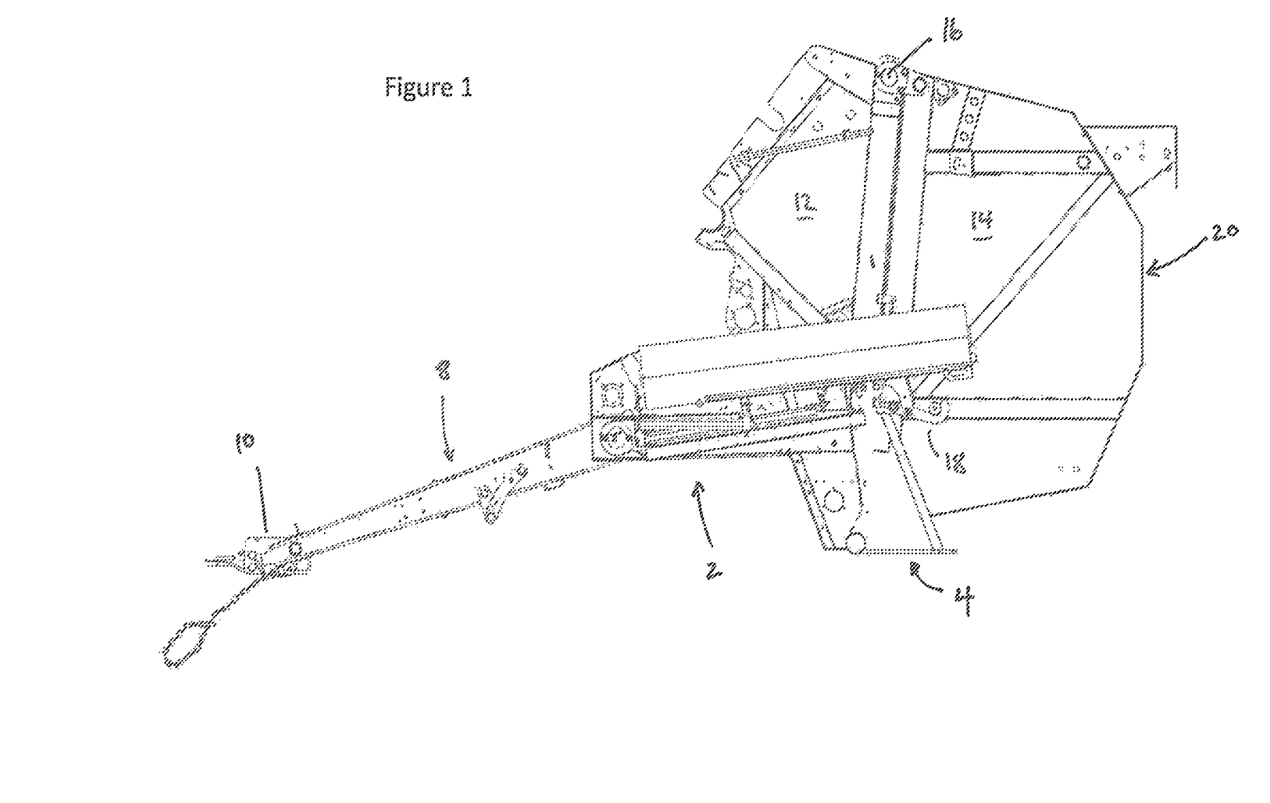
FIG. 1 shows a side view of elements of a baler including a loading apparatus in accordance with the present invention.
Figure 2:
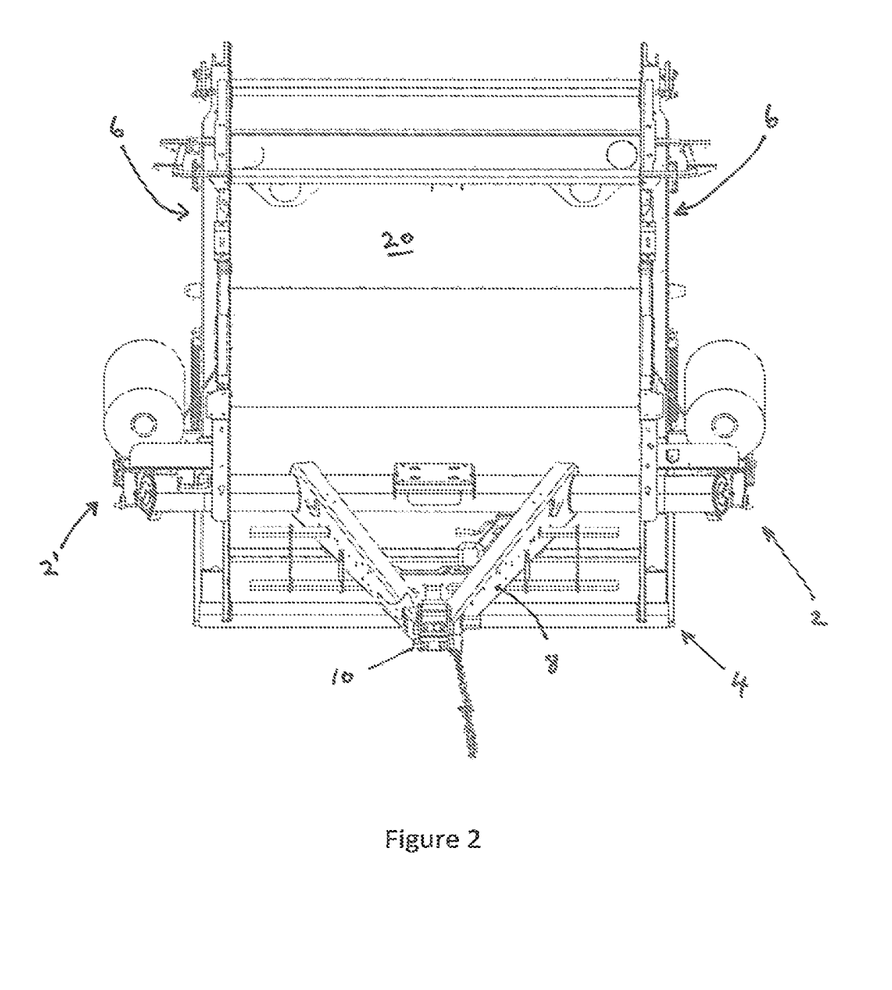
FIG. 2 shows a front end view of elements of a baler including loading apparatus in accordance with the present invention on each of the left and right hand sides of the baler.
Figure 3:
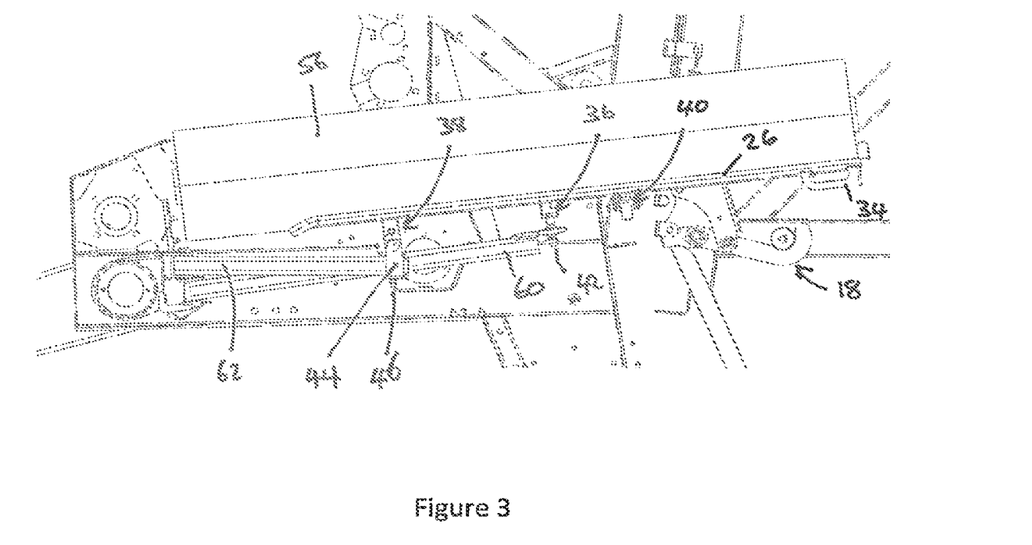
FIG. 3 shows a detail of the elements shown in FIG. 1.

With reference to FIGS. 1 and 2, elements of a round baler including a loading apparatus 2 in accordance with the present invention are shown including side walls 6 of the baler and a baler frame 4 including a tongue 8. A distal end of the tongue 8 is provided with a hitch 10 by which the baler may, in use, be secured to a suitable towing vehicle such as a tractor. The baler side walls 6 include mounting points for mounting of rollers that will serve to define a baling chamber.

Each of the side walls 6 is formed in two parts 12, 14. A first part 12 towards the front of the baler is secured to the baler frame 4 and includes at a rear upper region a pivot connection 16 for a second part 14 and at a rear lower region releasable means 18 for securing the second part to the first. The side walls of the first part 12 are held apart by cross members forming part of the baler frame 4. The second part 14 at the rear of the baler includes a rear wall 20 joining each of the second parts. The second part 14 is pivotally connected to the first part 12 at the rear upper region and releasably connected to the lower rear region and when pivoted into a raised position allows egress of a formed bale from the baling chamber.

Other elements that may be mounted to the baler frame 4 include a pick up apparatus and a binding mechanism including an unwind station for storage of a roll of binding material.

In use, as the baler is towed over a windrow of harvested crop material lying on a ground surface, the harvested crop material is lifted from the ground surface by the pick up apparatus and directed by way of a passage to the baling chamber, where the harvested crop material is formed into a cylindrical bale. Once the bale is of a desired size, the forward movement of the baler is halted such that further harvested crop is not directed into the baling chamber. The formed bale continues to be rotated and binding material is introduced from the unwind station into the baling chamber by a delivery apparatus forming part of the binding mechanism by way of a binding material inlet. Once the formed bale has been sufficiently bound, a severing apparatus forming part of the binding mechanism is actuated to sever the binding material within the baling chamber from the binding material being deployed from the unwind station. The bound formed bale can then be ejected from the baler.

It will be apparent that the binding material is a consumable item and a roll of binding material may need to be replaced on a number of occasions while baling. It will be appreciated that such rolls of binding material are heavy and cumbersome to manoeuvre, both when loading the roll of binding material to a suitable storage location on the baler and when moving the roll of binding material from such a storage location to the unwind station.

A round baler is provided with one or more, preferably two, loading apparatus in accordance with the present invention that may be used to store replacement rolls of binding material.

A first loading apparatus 2 will be described located to a first side of the baler. It will be understood that a second loading apparatus 2' on an opposite, second side of the baler will mirror the structure of the first loading apparatus and will accordingly not be described separately.

The loading apparatus 2 has first and second ends. The loading apparatus is displaceable between a storage position substantially parallel to a side of the baler and a transfer position in which the second end of the loading apparatus is pivotally displaced in relation to the first end of the loading apparatus.

The loading apparatus 2 includes a roll support 22. The roll support 22 comprises first and second side elements 24, 26 running substantially parallel to one another. At the second end of the loading apparatus the first and second side elements 24, 26 are connected by an end stop 28. The end stop 28 includes a plate 30 extending orthogonally with respect to the side elements 24, 26. In the illustrated embodiment the plate 30 is provided with a V-shaped upper edge. Conveniently the upper edge is provided with rounded surfaces. This may be provided by rollers mounted to the sides of the upper edge. Alternatively, as in the illustrated embodiment, the rounded surfaces are provided by curved extensions 32 of the plate 30.

In a preferred embodiment, manipulation means in the form of a handle 34 on each side element 24, 26 adjacent the end stop 28 are provided. Alternatively, the handle 34 need only be provided on an outer side of the loading apparatus 2. In a further alternative, no handles are provided and an operator may simply grasp the roll support 22 to manoeuvre the loading apparatus 2 to the transfer position and the roll support 22 together with a roll 56 of binding material to manoeuvre the loading apparatus 2 to the storage position.

A first cross member 36 extends beneath and connects the first and second side elements 24, 26 in a central region of the roll support 22. Preferably, a second cross member 38 is provided. The second cross member 38 extends beneath and connects the first and second side elements 24, 26. The second cross member 38 is located between the first cross member 36 and the end stop 28. The second cross member 38 is preferably provided with a releasable latching mechanism that allows the second cross member (and so the loading apparatus) to be secured to an adjacent side wall of the baler.

A third cross member 40 extends beneath and connects the first and second side elements 24, 26. The third cross member 40 is provided towards the first end of the roll support 22.

The first cross member 36 is provided on an inner side with a pivoting mount 42. The third cross member 40 is provided on a lower side with a bracket 44. The bracket 44 is suspended for movement about a substantially horizontal axis from the third cross member 40. The bracket 44 includes a pivoting mount 46 located toward an outer side of the roll support 22.

First and second mounting points 50, 52 may be provided on the side of the baler. Alternatively, a bracket 48 may be provided for securing to the side of the baler, the bracket including the first and second mounting points 50, 52. The bracket 48 may conveniently include a vertically upward extending flange 54. In use the flange 54 may serve as an end stop for a first end of the roll 56 of binding material when the loading apparatus is in the storage position.

The first mounting point 50 is provided on an inside of the bracket 48 to be adjacent the side wall of the baler. The first mounting point 50 conveniently comprises a pivot pin extending between upper and lower regions of a generally C-shaped element secured in any convenient manner to the bracket 48 (or to the baler frame). An upright connecting web of the C-shaped element is arranged inwardly and extends parallel to the side of the baler.

The second mounting point 52 is located outside of the first mounting point 50. The second mounting point 52 is also located above the first mounting point 50. The second mounting point 52 also conveniently comprises a pivot pin extending between upper and lower regions of a generally C-shaped element secured in any convenient manner to the bracket 48 (or to the baler frame). An upright connecting web of the C-shaped element is arranged inwardly and extends parallel to the side of the baler.

Figure 4:
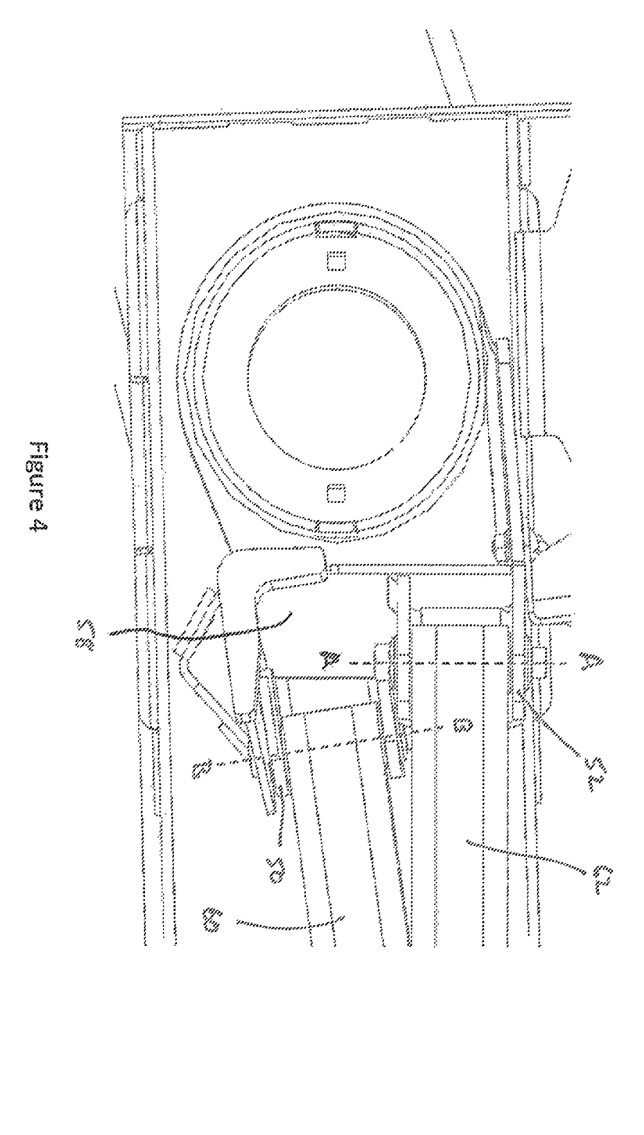
FIG. 4 shows an enlargement of one end of the loading apparatus shown in FIG. 3.
Figure 5:
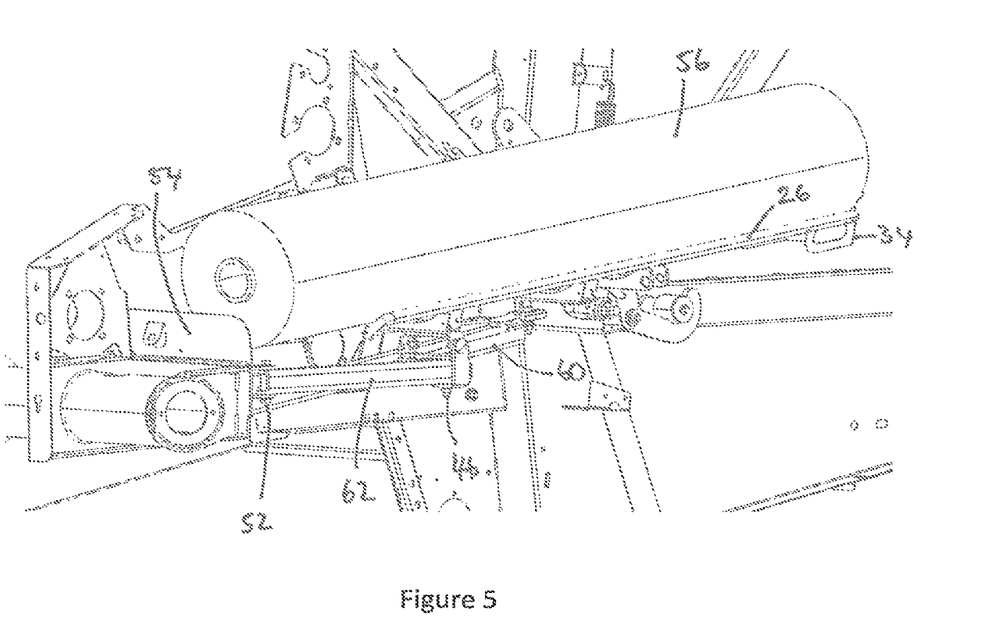
FIG. 5 shows a first perspective view of the elements in FIG. 3.
Figure 6:
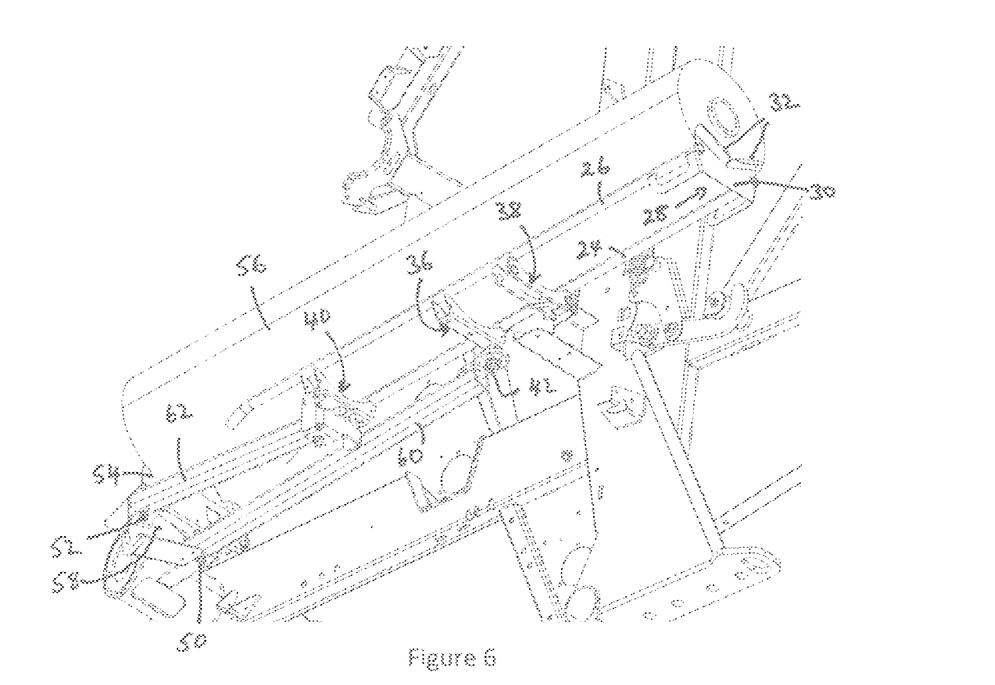
FIG. 6 shows a second perspective view of the elements in FIG. 3.
Figure 7:
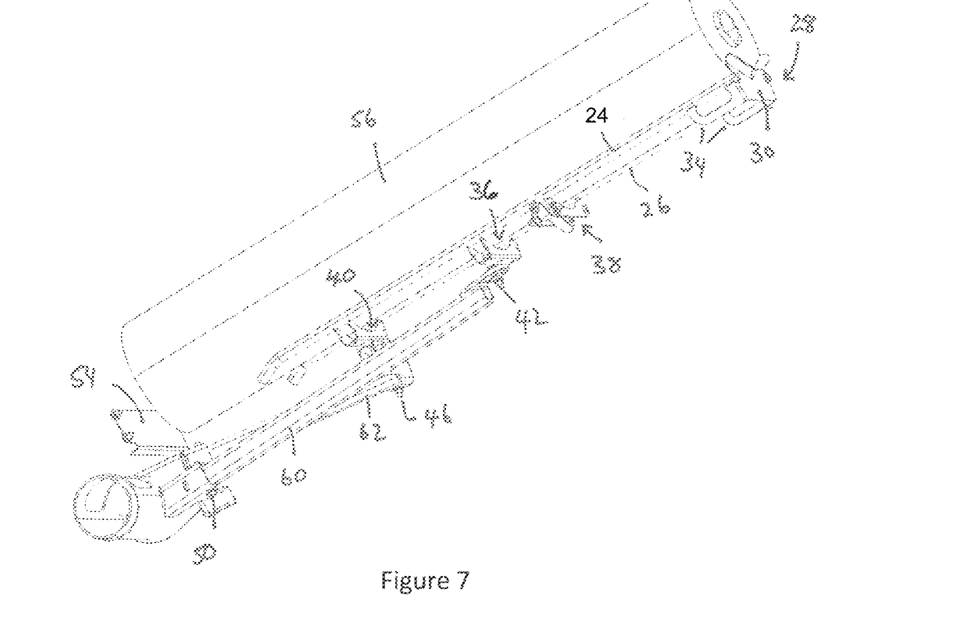
FIG. 7 shows a similar view to FIG. 6 with the baler elements omitted and viewed from the opposing side.
Figure 8:
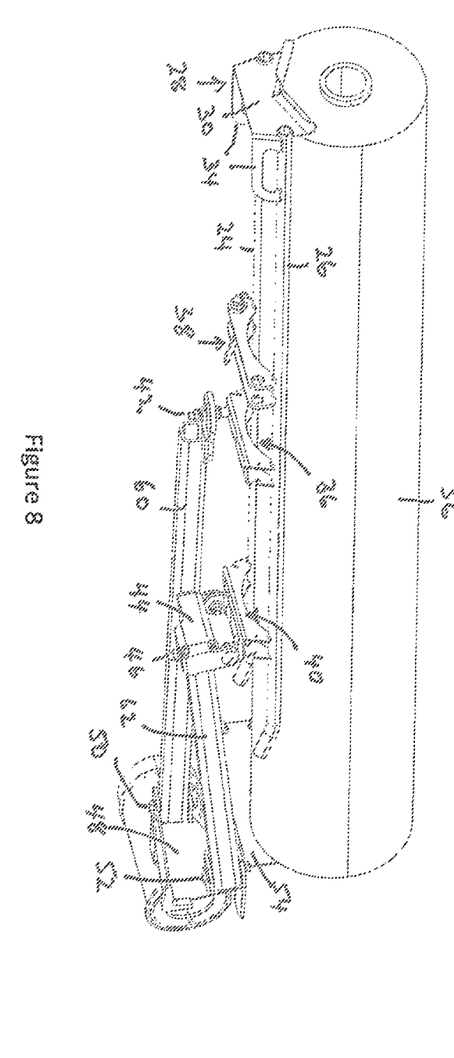
FIG. 8 shows a further perspective view of the loading apparatus of FIG. 7.
Figure 9:
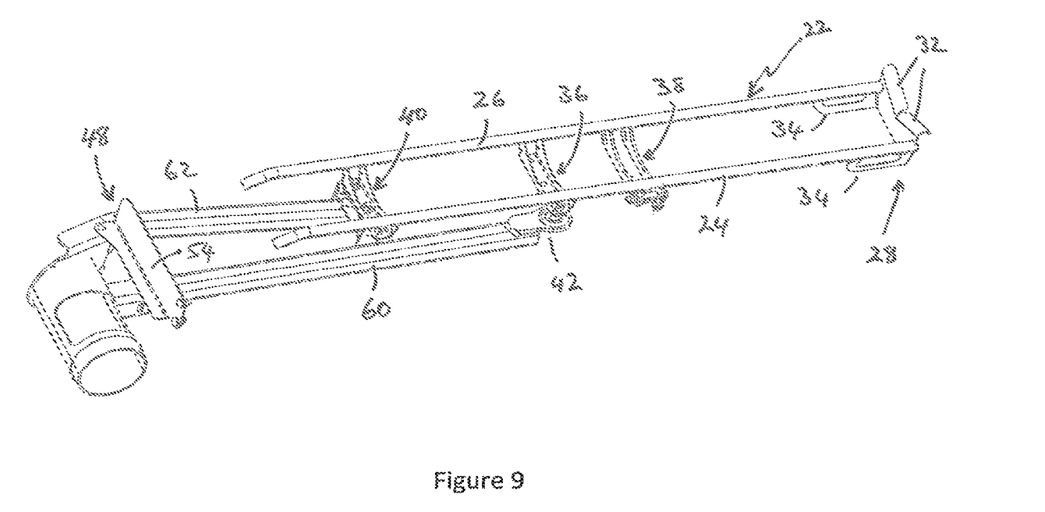
FIG. 9 shows a yet further perspective view of the loading apparatus of FIG. 7 omitting the roll of binding material.

The first and second mounting points 50, 52 each provide an axis of rotation. As best seen in FIG. 4, while the axis of rotation A-A of the second mounting point 52 is substantially vertical, the axis of rotation B-B of the first mounting point 50 is, in contrast, inclined at an angle to the vertical.

A first longer connecting element 60 connects the first mounting point 50 to the pivotal mounting 42 of the first cross member 36. A second shorter connecting element 62 connects the second mounting point 52 to the pivotal mounting 46 beneath the third cross member 40.

In the storage position of FIGS. 3 to 9 the second end of the loading apparatus 2 is raised relative to the first end. When an operator wishes to unload the roll 56 of binding material from the loading apparatus 2, the operator first decouples the loading apparatus 2 from the side of the baler, for example by releasing the latching mechanism associated with the second cross member 38.

The operator then pulls on the handle 34 to rotate the loading apparatus 2 around a first end. In particular the second connecting element 62 rotates around the second mounting point 52 such that the third cross member 40 transcribes a substantially horizontal arc. Concurrently, the first connecting element 60 rotates around the inclined axis of rotation B-B of the first mounting point 50 such that the first cross member 36 transcribes an inclined arc. In this way, as the loading apparatus 2 is moved away from the storage position the second end of the roll support 22 is lowered so that in the transfer position the first end of the loading apparatus 2 is raised relative to the second end.

By way of example, in the illustrated embodiment, the axis of rotation B-B of the first mounting point 50 is inclined 8.5 degrees forward and 2 degrees outward. It will be understood that changing these angles will affect the swing of the loading apparatus 2 as explained above. Other angles may be chosen for example to alter the height of the second end of the loading apparatus above a ground surface when the loading apparatus is in the transfer position.

The bracket 48 conveniently includes a vertical surface 58 (FIG. 4) extending orthogonally to the baler. This surface 58 can act as a stop for the first connecting member 60 and provides a limit to the degree of rotation of the loading apparatus 2 away from the side of the baler and ensures that the transfer position is substantially orthogonal to the storage position such that the roll support 22 is arranged with the supported roll 56 of binding material aligned with the unwind station. The rotation of the loading apparatus 2 in this way also allows the first end of the roll support 22 to rotate around the flange 54.

Conveniently, releasable restraining means may be provided for securing the roll 56 of binding material to the roll support 22. Such restraining means may conveniently comprise lengths of elasticated cord having hooks at each end. A hook at a first end may be secured to one of the side elements 24, 26, the cord then looped over the roll 56 of binding material and a hook at the second end secured to the other of the side elements 24, 26.

Once the loading apparatus is in the transfer position, the operator, having first removed any restraining means, is able to slide the roll 56 of binding material up off the inclined roll support 22 and into the unwind station.

The loading apparatus of the present invention also has an advantage when initially loading a roll 56 of binding material onto the loading apparatus 2. Since in the transfer position the second end of the roll support 22 is lower than the first end it is relatively easy for an operator to load the roll 56 of binding material onto the roll support 22. The rounded surfaces of the V-shaped upper edge of plate 30 allows an operator to centre the roll 56 of binding material onto the roll support 22 and then lift the roll 56 of binding material onto the roll support 22. The curved edges 32 assist the operator in this task. Once the second end of the roll 56 of binding material has passed over the end stop 28, gravity will urge the second end of the roll 56 of binding material downward and the roll 56 of binding material to slide down the roll support 22, such that the second end of the roll 56 of binding material abuts the end stop 28.

Should the operator wish releasable restraining means may then be used to secure the roll 56 of binding material to the roll support 22.

The operator then uses the handle 34 to direct the loading apparatus 2 back to the storage position. Once in position the operator secures the loading apparatus 2 in the storage position. Conveniently a latching mechanism is provided such that moving the loading apparatus 2 from the transfer position to the storage position automatically secures the loading apparatus 2 in the storage position.

All references cited herein are incorporated herein in their entireties. If there is a conflict between definitions herein and in an incorporated reference, the definition herein shall control.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings. From reading the present disclosure, other modifications will be apparent to persons skilled in the art. Such modifications may involve other features which are already known in the field of round balers and component parts therefore and which may be used instead of or in addition to features already described herein.

What is claimed is:

1. A loading apparatus for a round baler for loading a roll of binding material on the round baler comprises a binding material roll support displaceable about a first end between a storage position and a transfer position in which a second end is pivotally displaced relative to the first end, wherein when in the storage position the second end of the binding material roll support is raised relative to the first end of the binding material roll support and when in the transfer position the second end of the binding material roll support is lowered relative to the first end of the binding material roll support, and wherein the binding material roll support comprises a first inner lateral edge and a second outer lateral edge each extending between first and second ends of the binding material roll support, a stop provided at a second end of the binding material roll support, a first cross member extending beneath the binding material roll support between the first and second lateral edges and a second cross member extending beneath the support between the first and second lateral edges and located between the first cross member and the first end of the binding material roll support.

2. The loading apparatus according to claim 1, characterised in that the loading apparatus further comprises an additional stop located across a first end of the roll support when the loading apparatus is in the storage position.

3. The loading apparatus according to claim 1, characterised in that the stop provided at the second end of the roll support is V-shaped.

4. The loading apparatus according to claim 1, characterised in that an upper edge of the stop provided at the second end of the roll support presents a rounded surface.

5. The loading apparatus according to claim 1, characterised in that the second end of the roll support is provided with one or more manipulation means.

6. The loading apparatus according to claim 1, characterised in that the loading apparatus further comprises retention means for releasably retaining the roll of binding material on the roll support.

7. A loading apparatus for a round baler for loading a roll of binding material on the round baler comprises a binding material roll support displaceable about a first end between a storage position and a transfer position in which a second end is pivotally displaced relative to the first end, wherein when in the storage position the second end of the binding material roll support is raised relative to the first end of the binding material roll support, and when in the transfer position the second end of the binding material roll support is lowered relative to the first end of the binding material roll support, characterised in that the loading apparatus incorporates first and second mounting points, a first longer connecting element pivotally connected at a first end to the first mounting point for rotation about a first pivot axis and pivotally connected at a second end to the first cross member, a second shorter connecting element pivotally connected at a first end to the second mounting point for rotation about a second pivot axis and pivotally connected at a second end to the second cross member.

8. The loading apparatus according to claim 7, characterised in that the second mounting point is raised relative to the first mounting point.

9. The loading apparatus according to claim 7, characterised in that in the transfer position the second connecting element extends above the first connecting element.

10. The loading apparatus according to claim 7, characterised that in the storage position the second connecting element extends alongside the first connecting element.

11. The loading apparatus according to claim 7, characterised in that the first connecting element is connected to an inner side of the first cross member.

12. The loading apparatus according to claim 7, characterised in that the second connecting element is connected to an outer side of the second cross member.

13. The loading apparatus according to claim 7, characterised in that the first pivot axis is inclined to the vertical.

14. A round baler comprising a baling chamber, a feed apparatus adapted to introduce the binding material into the baling chamber to enable a formed bale to be bound within the baling chamber, an unwind station in which a roll of binding material may be located for feeding of the binding material to the feed apparatus and a first loading apparatus in accordance with claim 7 located to a first side of the baler.

15. The round baler according to claim 14, characterised in that the round baler further comprises a second loading apparatus in accordance with claim 3 located to a second side of the baler.

16. The round baler according to claim 15, characterised in that a latching mechanism is provided to secure each loading apparatus to the baler in the storage position.

17. The round baler according to claim 14, characterised in that a latching mechanism is provided to secure the loading apparatus to the baler in the storage position.

* * * * *